United States Patent [19]

Slezak

[11] Patent Number: 5,121,273
[45] Date of Patent: Jun. 9, 1992

[54] COMPUTER DISK HEAD INTERCONNECT ASSEMBLY

[75] Inventor: Arnold Slezak, Thousand Oaks, Calif.

[73] Assignee: Micropolis Corporation, Chatsworth, Calif.

[21] Appl. No.: 509,592

[22] Filed: Apr. 12, 1990

[51] Int. Cl.⁵ .......................... G11B 5/48; G11B 21/16
[52] U.S. Cl. ..................................... 360/104; 360/108
[58] Field of Search ..................... 360/104, 108, 106

[56] References Cited

U.S. PATENT DOCUMENTS

| | | | |
|---|---|---|---|
| 4,315,292 | 2/1982 | Kronfeld | 360/104 X |
| 4,645,280 | 2/1987 | Gordon | 360/104 X |
| 4,761,699 | 8/1988 | Ainslie | 360/104 X |
| 4,823,217 | 4/1989 | Kato | 360/104 |

Primary Examiner—A. J. Heinz
Attorney, Agent, or Firm—Poms, Smith, Lande & Rose

[57] ABSTRACT

Magnetic data read/write apparatus is disclosed for use in connection with a magnetic data storage disk. The apparatus includes a read/write head mounted onto a positioning device along with several electrical leads that extend from the read/write head to an interconnect pad mounted on the positioning device. The interconnect pad includes an electrically-conducting layer divided into several separate conducting paths corresponding to the number of leads to the read/write head. A portion of each separate conducting path is exposed to facilitate electically-conducting connections to the read/write leads. Additional portions of each separate conducting path is exposed to facilitate electrically-conducting connections to other electrical connectors so as to obviate further manipulation of the leads to the read/write head. The apparatus further includes a flex cable structure having a conducting layer divided into several separate conducting paths corresponding to the conducting paths in the interconnect pad. A portion of each conducting path in the flex cable forms an electrically-conducting connection to one of the separate paths in the interconnect pad. The flex cable may further include a second conducting layer similarly divided into several separate paths with the two conducting layers of the flexible cable partially overlapping in a region configured to form a pre-amplifier circuit.

11 Claims, 4 Drawing Sheets

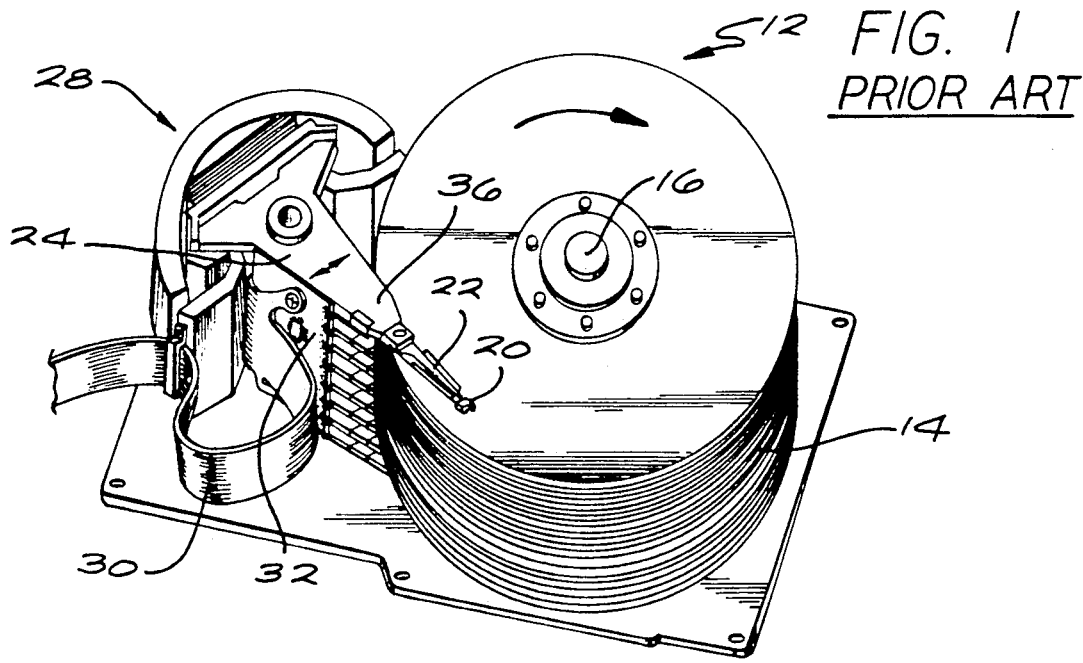
FIG. 1 PRIOR ART
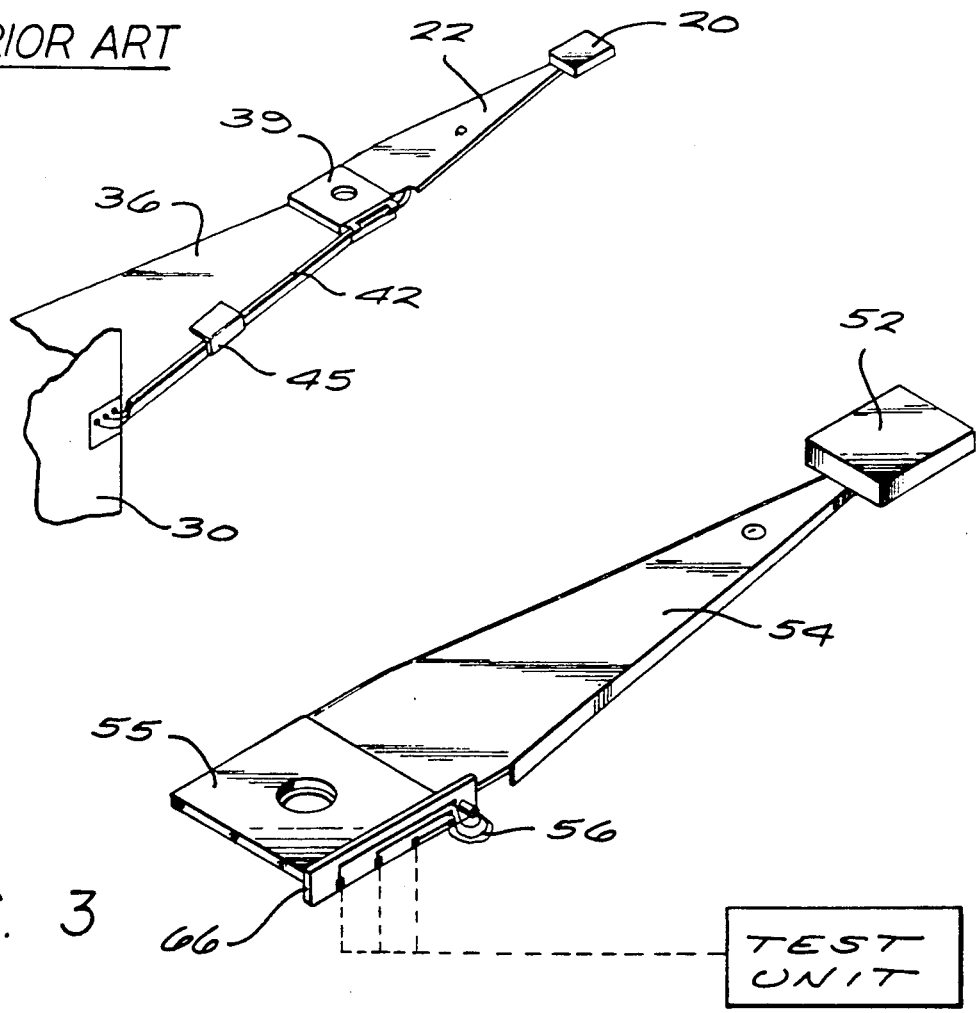
FIG. 2 PRIOR ART
FIG. 3

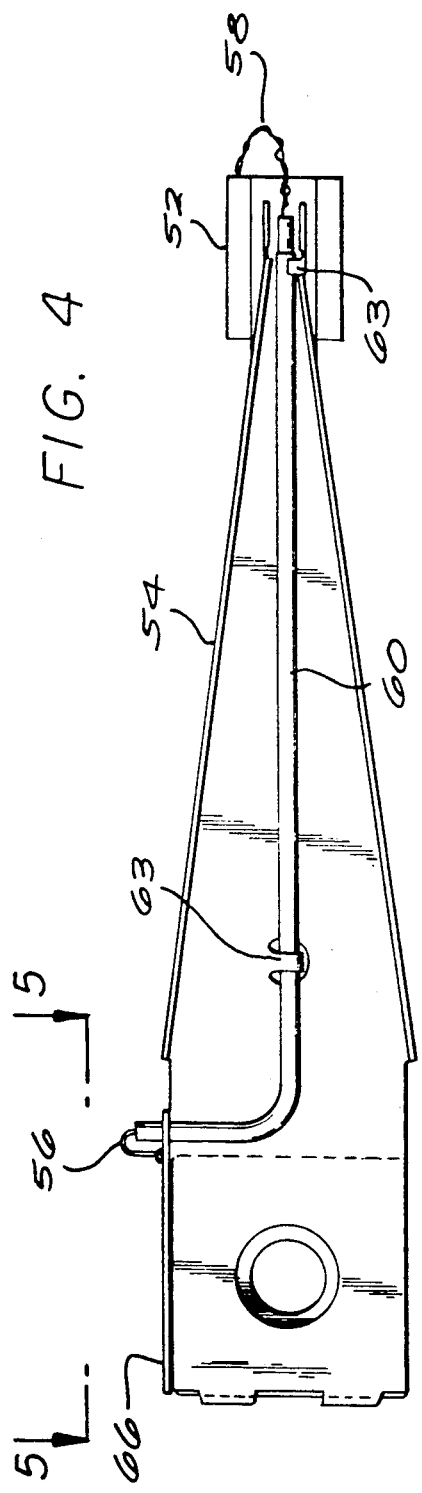
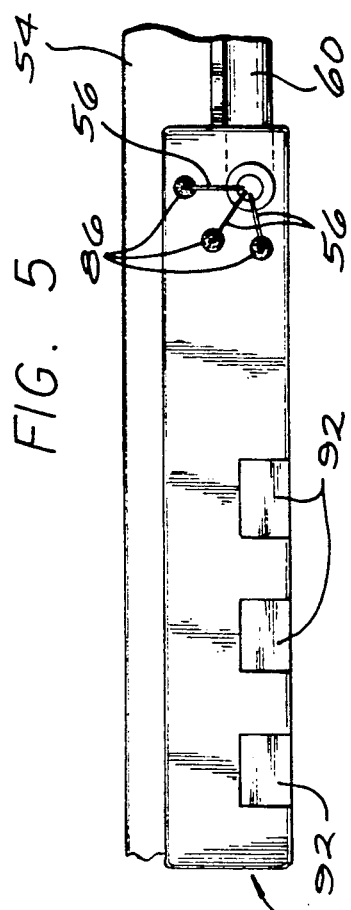
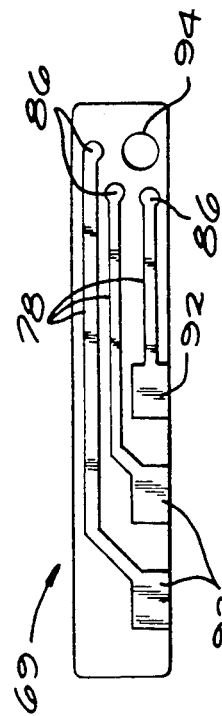
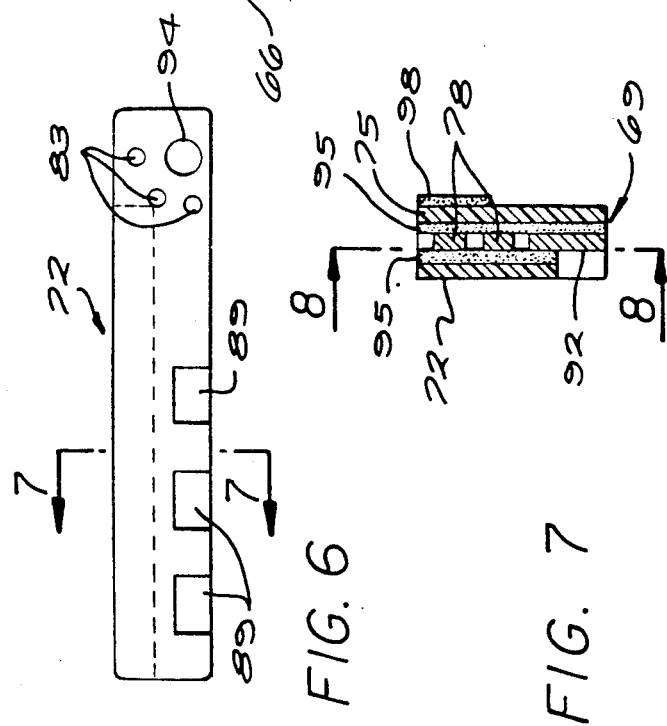

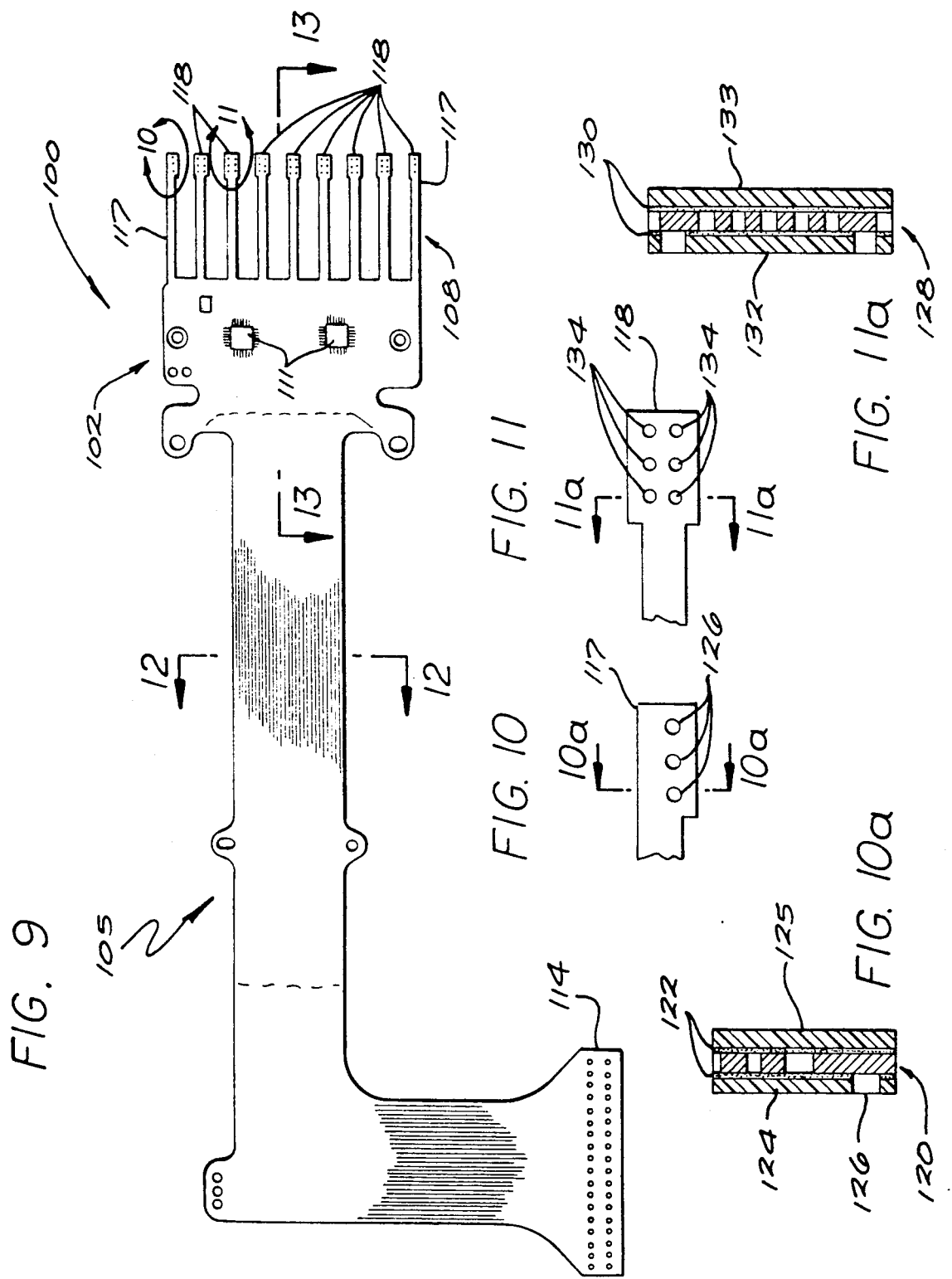

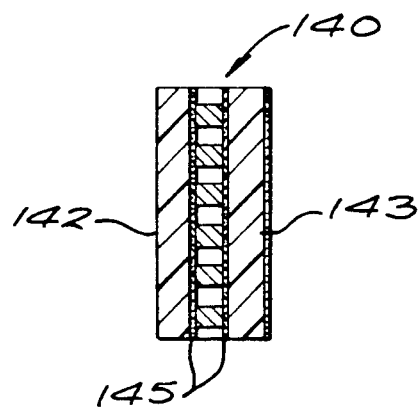
FIG. 12
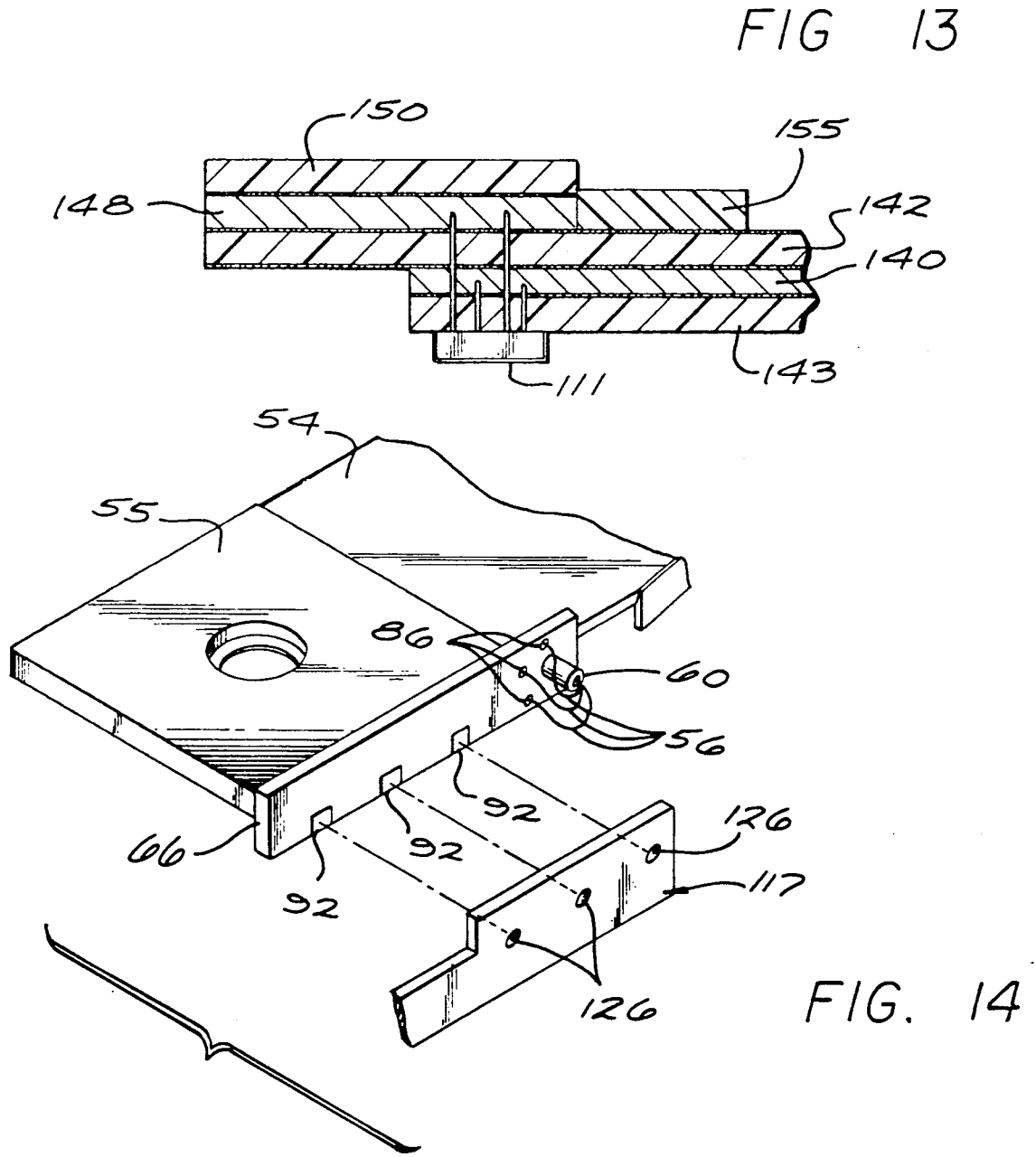
FIG. 13
FIG. 14

COMPUTER DISK HEAD INTERCONNECT ASSEMBLY

BACKGROUND OF THE INVENTION

1. Field of the Invention

The present invention concerns computer memory storage systems and, more particularly, magnetic data read/write apparatus for computer hard disk memories.

2. Description Of The Prior Art

Hard disk memories have become one of the more commonly used systems to store large quantities of data in computers. Typically between 20 million and 160 million bits of data can be stored on a single disk about five inches in diameter. Hard disk memories usually include a rigid disk, coated with a magnetic recording material, and one or more read/write heads disposed over the opposing flat surfaces of the disk to either impress a magnetic field onto a segment of the disk as data is "written" or to sense the polarization of an existing magnetic field as data is "read" from the disk.

In operation, the disk commonly spins at very high speeds with the read/write head floating on a boundary layer of air a few millionths of an inch above the disk surface. The read/write head is normally flexibly attached to a pivoting arm disposed adjacent the disk. Pivotal motion of the arm moves the position of the read/write head with respect to the center of the disk, thus affording the head coverage of the entire surface of the spinning disk. Typically electrical signals are sent to and received from the read/write head through several leads that are attached to the positioning arm. These leads commonly terminate in a pre-amplifier circuit. In order to allow the head to track variations in the disk surface while maintaining an optimum spacing between the read/write head and the disk, the end of the arm from which the head is suspended typically weighs as little as possible while still maintaining a desired stiffness. The read/write leads are also commonly made from an extremely fine, low-mass wire.

In some applications, such as mid-sized mainframe computers, several hard disks are employed together. The disks are commonly mounted on a single spindle and rotate in unison. The associated read/write heads are similarly mounted on a common positioning device so that all of the heads pivot in unison. Typically these multiple read/write heads are attached to individual lightweight suspension arms which are in turn mounted onto a more sturdy unitary positioner structure. A preamp circuit is also normally attached to this unitary positioner.

While suitable for accessing a large amount of data quickly, computer memory storage devices employing hard disks suffer from some drawbacks. Normally a pair of read/write heads are employed with each disk, and each read/write head commonly has three leads. Thus where eight disks operate in unison, sixteen read/write heads are normally employed along with forty-eight leads. Usually the individual read/write leads are then soldered onto the pre-amp circuit attached to the unitary positioner structure. Attaching all of these leads to the pre-amp circuit, however, is commonly a time intensive project that easily results in mis-wiring. Additionally, the fine, low-mass leads to the read/write heads are easily damaged. A small loop, called a service loop, must normally be maintained at the ends of the leads adjacent the read/write heads. Manipulation of the leads while attaching them to the pre-amp circuit can damage the service loops, requiring re-working of the minute connections between the individual leads and the read/write heads. During assembly, it is not uncommon to damage as many as ten percent of the service loops, resulting in costly and labor-intensive repair of the read/write heads.

Thus there still exists a need for a magnetic data read/write apparatus, suitable for use with hard disks, that permits the use of low-mass read/write leads while avoiding the disadvantages of the prior art. The present invention solves this need.

SUMMARY OF THE INVENTION

Briefly, and in general terms, the present invention provides a magnetic data read/write apparatus employing an electrical wiring system that requires less complex assembly procedures and is subject to lower attrition rates during assembly. The present invention can thus affect significant cost savings due to simplified and more successful assembly processes. The apparatus of the present invention also facilitates use of semi-automated assembly techniques.

More specifically, the magnetic data read/write apparatus of the present invention includes a read/write head mounted on a positioning device along with several electrical leads that extend from the read/write head to a novel interconnect pad mounted on the positioning device. The interconnect pad includes an electrically-conducting layer disposed between a pair of insulting layers and forming several separate conducting paths, one for each of the read/write leads. Two portions of each conducting path are exposed through one of the insulting layers to facilitate electrically-conducting connections to the read/write leads at one of the exposed regions and to facilitate electrically-conducting connections to more rugged electrical conductors at the other exposed region.

The magnetic data read/write apparatus of the present invention also includes a novel flex cable structure. This flex cable includes a conducting layer disposed between a pair of insulating layers and divided into several separate conducting paths. A portion of each conducting path in the flex cable is also exposed through one of the insulting layers near an end of the flex cable in a pattern corresponding to the pattern of exposed conducting regions in the interconnect pad. The flex cable may be attached to the read/write head positioning device and may also be adapted to mount a pre-amplifier circuit.

The novel features which are believed to be characteristic of the present invention will be better understood from the following detailed description, considered in connection with the accompanying drawings, wherein like numbers designate like elements. It should be expressly understood, however, that the drawings are for purposes of illustration and description only and are not intended as a definition of the limits of the invention.

BRIEF DESCRIPTION OF THE DRAWINGS

FIG. 1 is a perspective view of a prior art hard disk memory storage device.

FIG. 2 is a perspective view of a prior art magnetic data read/write head and suspension assembly.

FIG. 3 is a perspective view of a read/write head and suspension assembly of the present invention.

FIG. 4 is a top view of the read/write head and suspension assembly of the present invention illustrated in FIG. 3.

FIG. 5 is an expanded partial view of a portion of the suspension assembly illustrated in FIG. 4.

FIG. 6 is a side view of the read/write lead interconnect pad of the present invention.

FIG. 7 is a sectional end view of the read/write lead interconnect pad of the present invention along the lines VII—VII in FIG. 6.

FIG. 8 is a sectional side view of the read/write lead interconnect pad of the present invention along the lines VIII—VIII in FIG. 7.

FIG. 9 is a top view of the flex cable circuit of the present invention.

FIG. 10 is an expanded partial view of the end of the flex cable of the present invention illustrated in FIG. 9.

FIG. 10a is a sectional view of an end of the flex cable illustrated in FIG. 10 along the lines X—X.

FIG. 11 is another expanded partial view of the end of the flex cable of the present invention illustrated in FIG. 9.

FIG. 11a is a sectional view of an end of the flex cable illustrated in FIG. 11 along the lines XI—XI.

FIG. 12 is a sectional end view of the flex cable of the present invention along the lines XII—XII in FIG. 9.

FIG. 13 is a sectional side view of one end of the flex cable of the present invention along the lines XIII—XIII in FIG. 9.

FIG. 14 is an expanded perspective view of the end of the flex cable of the present invention illustrated in FIG. 9 adjacent the interconnect pad of the present invention illustrated in FIG. 5.

DETAILED DESCRIPTION OF THE INVENTION

Referring now to the figures, and more particularly FIG. 1, there is shown a conventional hard disk memory storage system 12. As illustrated, the disk system 12 includes several hard disks 14 arranged in a stack and rotating in unison about a common spindle 16 along with a magnetic data read/write apparatus 18 disposed adjacent the stack of hard disks 14. The read/write apparatus 18 includes several read/write heads 20 individually attached to corresponding suspension arms 22 that are in turn commonly attached to a unitary positioner 24. The read/write heads 20 and suspension arms 22 move in unison with respect to the stack of hard disks 14 as the positioner 24 rotates about a shaft 26. The angular orientation of the positioner 24, and the radial position of the read/write heads 20 with respect to the hard disks 14, is controlled by a precision magnetic drive 28. Electrical signals are sent to and received from the read/write heads 20 through a flex cable 30 that is attached to the positioner 24. A pre-amplifier circuit 32 is also mounted on the flex cable 30.

As illustrated in FIG. 2, each of the read/write heads 20 and the corresponding suspension arms 22 of the conventional read/write apparatus 18 are attached to individual arms 36 of the unitary positioner 24 by a swage plate 39. A number of leads 42 are also attached to each of the read/write heads 20. These leads 42 extend from the head 20 along the underside of the suspension arm 22 and the side of the individual arms 36 of the positioner 24 to the edge of the flex cable 30.

During assembly of the conventional read/write apparatus 18 illustrated in FIGS. 1 and 2, the individual read/write heads 20 and corresponding leads 42 are attached to the suspension arms 22 and then tested. The combined read/write head 20 and the suspension arm 22 assemblies are then mounted on the individual arms 36 of the unitary positioner 24 with the leads 42 secured to the edge of the arms 36, commonly with tape 45. All of the suspension arms 22 and heads 20 may first be mounted onto the respective arms 36 of the positioner 24, and the various leads 42 of each read/write head 20 subsequently attached to the edge of the flex cable 30 or, alternatively, the leads 42 of each head 20 may be individually attached to the flex cable 30 as each read/write head 20 and suspension arm 22 assembly is mounted onto a corresponding arm 36 of the positioner 24. In either instance, however, mis-wiring of the leads 42 to the proper connections at the edge of the flex cable 30 is not uncommon. Additionally, handling of the leads 42 as they are attached to the edge of the individual arms 36 of the positioner 24 and soldered to the flex cable 30 may, in a number of instances, damage the service loop and the fragile connections between the read/write heads 20 and the leads 42.

Referring now to FIGS. 3-8, there is shown one presently preferred embodiment of the magnetic data read/write apparatus 50 of the current invention. The apparatus 50 includes a read/write head 52 flexibly coupled to a suspension arm 54 along with a series of leads 56 connected to the read/write head 52. A swage plate 55 is also attached to one end of the suspension arm 54 to facilitate mounting the suspension arm 54 onto a positioner device (not shown). As illustrated in FIGS. 3 and 4, the leads 56 extend from the read/write head 52 so as to form a service loop 58 and are preferably, though not necessarily, encased in an insulating sheath 60. It is generally desirable, though not essential, to attach the sheath 60, and thus the leads 56 to the suspension arm 54 in some convenient manner such as, for example, by use of tabs 63 stamped from the suspension arm 54. In accordance with the present invention, the leads 56 are terminated at an interconnect pad 66 attached to a side of the suspension arm 54 adjacent an end of the arm 54 engaging the positioner device. The interconnect pad 66 includes a series of separate electrically conducting paths corresponding to the number of leads 56 connected to the read/write head 52 so as to provide electrical connections with the read/write head 52 that do not necessitate direct attachment to the leads 56.

As more clearly illustrated in FIGS. 5-8, the presently preferred embodiment of the interconnect pad 66 includes a conducting layer 69 disposed between a pair of insulating layers 72 and 75. The conducting layer 69 is divided into several separate electrically conducting paths 78 each corresponding to one of the leads 56 attached to the read/write head 52. The presently preferred embodiment of the interconnect pad 66 is configured for use with read/write heads 52 requiring the use of three separate leads 56. This is one of the more common read/write head configurations currently employed in the computer industry. Accordingly, the conducting layer 69 is divided into three conducting paths 78. Of course, a different number of conducting paths 78 could be formed in the conducting layer 69 without departing from the spirit of the present invention.

To accommodate electrical contact between the leads 56 and the conducting paths 78, apertures 83 are formed in the insulating layer 72 so as to expose contact regions 86 at one end of the conducting paths 78. These contact regions 86 may have an expanded area to facilitate connection with the leads 56. The insulating layer 72 is similarly provided with a second set of apertures 89 exposing a second set of contact regions 92 in the conducting paths 78. The contact regions 92 also have an enlarged surface area to facilitate electrical connections between the conducting paths 78 and subsequent electrical conductors that are sturdier than the read/write leads 56. In the presently preferred embodiment of the current invention, these sturdier electrical conductors include the novel flex cable 100 illustrated in FIGS. 9-13 and discussed more fully below. The interconnect pad 66 is also provided with an aperture 94 through both of the insulating layers 72 and 75 as well as the conducting layer 69, to secure an end of the sheath 60 within which the read/write leads 56 are disposed.

Thus, as illustrated in FIGS. 4 and 5 one end of each lead 56 is attached to the read/write head 52, forming part of the service loop 58 and then extends along the length of the suspension arm 54 within the sheath 60. In turn the sheath 60 is secured to the suspension arm 54 by the tabs 63 and projects through the aperture 94 in the interconnect pad 66. Each lead 56 extends out of the sheath 60 and is separately attached to one of the exposed contact regions 86 of the interconnect pad 66. Electrical signals can thus be sent to and received from the read/write head 52 by electrical connections with the exposed contact regions 92 of the interconnect pad 66, without further handling of the leads 56.

To facilitate attachment of the leads 56 to the exposed contact regions 86 of the interconnect pad 66, and similarly facilitate attachment of more rugged electrical conductors to the second set of exposed contact regions 92 in the interconnect pad 66, both sets of exposed regions 86 and 92 may be coated with a layer of solder. The leads 56, and the sturdier electrical conductors, can then be attached to the exposed contact regions 86 and 92 by re-solder operations well known in the art.

In the presently preferred embodiment, the conducting layer 69 of the interconnect pad 66 is made of copper while the insulating layers 72 and 75 are a polyimide-type compound such as, for example, KAPTON (a trademark). The copper-conducting layer 69 may be bonded to the KAPTON insulating layers 72 and 75 with adhesive layers 95 disposed on inward-facing surfaces of both KAPTON insulating layers 72 and 75. A layer of adhesive 98 may also be disposed on a portion of an outward facing surface of the KAPTON insulating layers 72 and 75 to bond the interconnect pad 66 to the side of the head suspension arm 54. By bonding a thin copper-conducting layer 69 onto a polyimide insulating layer 75 with an appropriate adhesive, the separate conducting paths 78 may be formed in the conducting layer 69 by convention photolithographic etching techniques, such as those well known in the art.

As more clearly illustrated in FIGS. 3 and 4, the interconnect pad 66 is attached to a portion of the suspension arm 54 which, in use, overlaps a rigid portion of a unitary positioning device that positions the read/write head 52 with respect to the hard disk. The suspension arm 54 normally flexes while in operation to accommodate motion of the read/write head 52 as it tracks variations in the surface of the hard disk. The portion of the suspension arm 54 supporting the interconnect pad 66 is secured by the unitary positioning device and cannot flex or bend when the read/write apparatus is in operation. The interconnect pad 66 is therefore not subject to transverse flexure in use and its placement on the suspension arm 54 does not degrade the tracking performance of the read/write head 52 and suspension arm 54 assembly.

Referring to FIGS. 9-11 there is illustrated a presently preferred embodiment of the novel flex cable 100 of the present invention suitable for use in connection with a computer memory storage system using several hard disks in a stack. As shown in FIG. 9, this flex cable 100 is divided into three separate regions—102, 105 and 108. A first region 102 is adapted to form a pre-amplifier circuit including integrated circuits 111 and is mounted onto the positioner device (not shown) to which the suspension arms 54 and read/write heads 52 are mounted. A second portion 105 of the flex cable 100 forms a flexible electrically conducting connection between the first, pre-amp, region 102 of the flex cable 100 and subsequent circuitry (not shown). This second flex cable portion 105 terminates in a conventional interconnect plug 114 suitable for use with the subsequent circuitry.

In accordance with the present invention, the third portion 108 of the flex cable 100 is divided into individual ribbons 117 and 118 extending from an end of the first, pre-amp, region 102 of the flex cable 100. These ribbons 117 and 118 provide electrical connections between the first, pre-amp, region 102 of the flex cable 100 and the interconnect pads 66. The flex cable ribbons 117 are disposed along the longitudinal edges of the flex cable 100 and are each adapted to form electrical connections between a single interconnect pad 66 and the pre-amp region 102 of the flex cable 100. The flex cable ribbons 118 are disposed between the ribbons 117 along the edges of the flex cable 100 and are adapted to form electrical connections between a pair of interconnect pads 66 and the flex cable pre-amp region 102.

As illustrated in FIGS. 10 and 10a, each flex cable ribbon 117 includes a conducting layer 120 bonded by adhesive layers 122 to opposing insulating layers 124 and 125. The conducting layer 120 is divided into several separate electrically-conducting paths corresponding to the number of conducting paths 78 in the interconnect pads 66. As discussed above, the presently preferred embodiment of the interconnect pads 66 is configured for use with read/write heads 22 employing three leads 56. Thus the conducting layer 120 within each flex cable ribbon 117 is also divided into three separate electrically-conducting paths. As shown, the insulating layer 124 of each flex cable ribbon 17 is also provided with three apertures 126 arranged in a pattern corresponding to the pattern of apertures 89 in the interconnect pads 66 to allow contact between the separate electrically-conducting paths of the conducting layer 120 within the flex cable ribbons 117 and the exposed areas 92 of the electrically-conducting paths 78 within the interconnect pads 66. Similarly, as illustrated in FIGS. 11 and 11a, each of the flex cable ribbons 118 includes a conducting layer 128 bonded with adhesive layers 130 to insulating layers 132 and 133. Since the flex cable ribbons 118 are adapted to engage two interconnect pads 66, the conducting layer 128 within each ribbon 118 is divided into six separate electrically-conducting paths. Additionally, the insulating layer 132 of each flex cable ribbon 118 is provided with six apertures 134 arranged in a pattern corresponding to the patterns of apertures 89 in two interconnect pads 66 so as to allow contact between the separate electrically-conducting paths of the conducting layer 128 in the flex cable ribbon 118 and the exposed areas 92 of the conducting paths 78 within two interconnect pads 66.

Preferably, though not necessarily, the conducting layers 120 and 128 within the respective flex cable ribbons 117 and 118 are copper and the respective insulating layers 124 and 125 of the flex cable ribbon 117 as well as the insulating layers 132 and 133 of the flex cable ribbon 118 are KAPTON. Additionally, the ribbons 117 and 118 of the third flex cable portion 108 can be fabricated using conventional photolithographic processes known in the electronics art.

Referring to FIGS. 12 and 13 there are shown sectional views of the flex cable 100. The second flex cable region 105, terminating in the interconnect plug 114, is also made of a conducting layer 140 forming several separately conducting paths and disposed between a pair of insulating layers 142 and 143. Preferably, though not necessarily, the conducting layer is made of copper and the insulating layers 142 and 143 are KAPTON. A pair of adhesive layers 145 may also be used to bond the KAPTON insulating layers 132 to the copper-conducting layer 126. As shown in the side-sectional view of FIG. 13, the second and third flex cable regions 105 and 108 overlap to form the first, pre-amp, region 102 of the flex cable 100. Thus the flex cable pre-amp region 102 includes the conducting layer 140 of the second flex cable region 105 and a second conducting layer 148 made up of the individual conducting layers 120 and 128 from all of the respective flex cable ribbons 117 and 118. The integrated circuits 111 include leads 149 selectively engaging the two conducting layers 140 and 148. The separate conducting layers 140 and 148 of the first, pre-amp, region 102 of the flex cable 100 are separated by the insulating layer 142 of the second flex cable region 105 and are further enclosed between the insulating layer 143 of the second flex cable region 105 and another insulating layer 150 made up of the individual insulating layers 124 and 132 of each of the respective ribbons 117 and 118 in the third flex cable region 108. An additional insulating layer 155 is attached to the insulating layer 140 adjacent the conducting layer 148 to provide enhanced structural support to a portion of the flex cable 100 that bends while the read/write apparatus 50 of the present invention is in operation.

Use of the interconnect pads 66 along with the flex cable ribbons 117 and 118 in the present invention to provide electrically connections between the read/write heads 52 and the pre-amp circuit portion 102 of the flex cable 100 has several distinct advantages over conventional read/write interconnect structures. The present inventive structure, for example, provides a far simpler assembly procedure. The hard disk read/write apparatus of the present invention can be assembled by mounting the read/write heads 52 and interconnect pads 66 onto the suspension arms 54 and attaching the leads 56 to the interconnect pads 66. This sub-assembly can then be electrically tested before attachment, along with several other such assemblies, to a common read/write head positioner device. After testing, subsequent electrical connections to are easily accomplished by attaching the flex cable ribbons 117 and 118 to the interconnect pads 66 rather than by directly engaging the extremely fragile leads 56. The connections between the interconnect pads 66 and the flex cable ribbons 117 and 118 may, if desired, be made by semi-automated or automated procedures.

It will, of course, be understood that modifications may be made to the presently preferred embodiment discussed above without departing from the scope of the current invention. Thus, for example, the interconnect pads 66 could be used alone to terminate the fragile leads from the read/write heads and provide electrical connections to a subsequent electrical circuit entirely different from the novel flex cable structure 100 discussed above. Alternatively, the novel flex cable structure 100 could be provided with a single set of electrically conducting paths extending from the interconnect pads 66, which pivot during operation, to a stationary integrated circuit, thus obviating the pre-amp portion 102 of the flex cable 100.

Accordingly, the scope of the present invention is not to be limited by the preferred embodiments discussed above but only by the claims below and equivalents thereof.

What is claimed is:

1. An apparatus for reading magnetic data, comprising:
   a hard disk having surfaces coated with magnetic data storage medium;
   a magnetic data read/write head disposed adjacent to hard disk and having a plurality of electrically conducting leads;
   a suspension arm having a first portion, a second flexible portion and a third nonflexible portion, the magnetic data read/write head being operatively coupled to said first portion;
   positioner means, disposed adjacent the hard disk, for positioning the suspension arm with respect to the hard disk, said positioner means including a movable first portion and a stationary second portion, said third portion of the suspension arm being attached to said movable first portion of the positioner means;
   an interconnect pad, attached to said third portion of the suspension arm, including an electrically-conducting layer disposed between insulating layers and forming a plurality of separate electrically-conducting paths respectively attached to the leads of said read/write head wherein said leads extend from said head along said suspension arm second portion to said interconnect pad; and
   a flexible cable having a first portion attached to said movable first portion of the positioner means and a stationarily mounted second portion, said cable including a conducting layer disposed between insulating layers and forming at a first end a plurality of separate conducting paths respectively connected to the separate conducting paths of the interconnect pad, wherein electrical connections are established between the head means and the flexible cable through the interconnect pad.

2. The read/write apparatus of claim 1 wherein said interconnect pad is formed of a layer of copper disposed between layers of a polyimide tape.

3. The flex cable of claim 1 further comprising a second conducting layer disposed between insulating layers and forming a plurality of separate conducting paths, a portion of said first and second flex cable conducting layers partially overlapping and separated by an insulating layer.

4. The read/write apparatus of claim 1 wherein said interconnect pad further defines a bore configured to receive the leads of said head means.

5. A read/write apparatus for use with a device that stores data magnetically, comprising:
   a hard disk having planar surfaces coated with a magnetic data storage medium;

head means for reading and writing magnetic data from the hard disk;

a plurality of electrically-conducting leads attached to said head means;

a suspension arm having a first portion, a flexible second portion and a nonflexible third portion, said first portion being, operatively coupled to said head means;

positioner means, disposed adjacent the hard disk, for positioning the suspension arm and head means with respect to the hard disk, said positioner means having a first movable portion on which the third nonflexible portion of the suspension arm is mounted;

an interconnect pad, attached to said third nonflexible portion of the suspension arm mounted on the first movable portion of the positioner means, including an electrically-conducting layer disposed between a pair of insulating layers and divided into a plurality of separate electrically-conducting paths respectively attached to said leads, one of said insulating layers having a first set of apertures through which the separate paths of the conducting layer are respectively attached to the leads said electrically-conducting leads extend from said head means along said suspension arm second portion to said interconnect pad; and a flexible cable having a first portion attached to the movable first portion of the positioner means and a second portion that is stationarily mounted, including a conducting layer disposed between insulating layers and forming at said first portion a plurality of separate conducting paths respectively connected to the separate paths of the interconnect pad conducting layer, wherein electrical connections are established between the leads of the head means and the flexible cable through the interconnect pad.

6. The read/write apparatus of claim 5 wherein said interconnect pad defines a bore configured to receive said leads.

7. The read/write apparatus of claim 5 wherein the conducting layers of said interconnect pad and said flexible cable are copper and wherein said interconnect pad and flexible cable insulating layers are a polyimide tape.

8. The flexible cable of claim 5 further comprising a second conducting layer disposed between insulating layers and forming a plurality of separate conducting paths with a portion of said first and second flexible cable conducting layers partially overlapping and separated by an insulating layer.

9. An apparatus for reading and writing magnetically stored data, comprising:

a plurality of hard disk magnetic storage devices arranged in a stack and having a generally common axis of rotation;

a plurality of magnetic data read/write heads respectively disposed adjacent flat surfaces of the hard disks, each of the read/write heads having a plurality of electrical leads attached thereto;

a plurality of suspension arms each having a first portion, a flexing second portion and a nonflexing third portion, each first portion of the suspension arms being operatively coupled to an associated read/write head;

a positioner means, disposed adjacent the stack of hard disks, for moving each of the suspension arms with respect to the hard disks, said positioner means including a movable first portion to which each of the third portions of the suspension arms are mounted, and a stationary second portion;

a plurality of interconnect pads, respectively attached to a third portion of an associated suspension arm and read/write head, each pad including an electrically-conducting layer disposed between insulating layers and divided into a plurality of separate electrically-conducting paths each respectively electrically coupled to a lead of an associated read/write head wherein said leads extend from an associated head along a respective suspension arm second portion to a respective interconnect pad; and a flex cable having a first portion mounted onto the moving first portion of the positioner means and a non-moving second portion mounted stationarily, said flex cable having an electrically conducting layer disposed between insulating layers and forming a plurality of separate electrically conducting paths and a first end defining a plurality of separate ribbons each terminating adjacent to and electrically coupled to an associated interconnect pad mounted onto an associated suspension arm, each ribbon having a set of electrically-conducting paths respectively terminating in a pattern corresponding to a pattern formed by the separate electrically-conducting paths of the associated interconnect pad, wherein electrical contact between the leads of each read/write head and a ribbon end of the flex cable is made through the interconnect pad.

10. The read/write apparatus of claim 9 wherein said interconnect pads further define bores configured to receive the leads of an associated read/write head.

11. The read/write apparatus of claim 9 wherein the conducting layer of said interconnect pads are copper and wherein said insulating layers of the interconnection pad are polyimide tape.

* * * * *